June 30, 1959 D. T. GILMORE 2,892,585
PISTOL GRIP ELECTRIC PROD

Filed April 23, 1957 3 Sheets-Sheet 1

Dale T. Gilmore
INVENTOR.

BY
Attorneys

June 30, 1959  D. T. GILMORE  2,892,585
PISTOL GRIP ELECTRIC PROD
Filed April 23, 1957  3 Sheets-Sheet 2
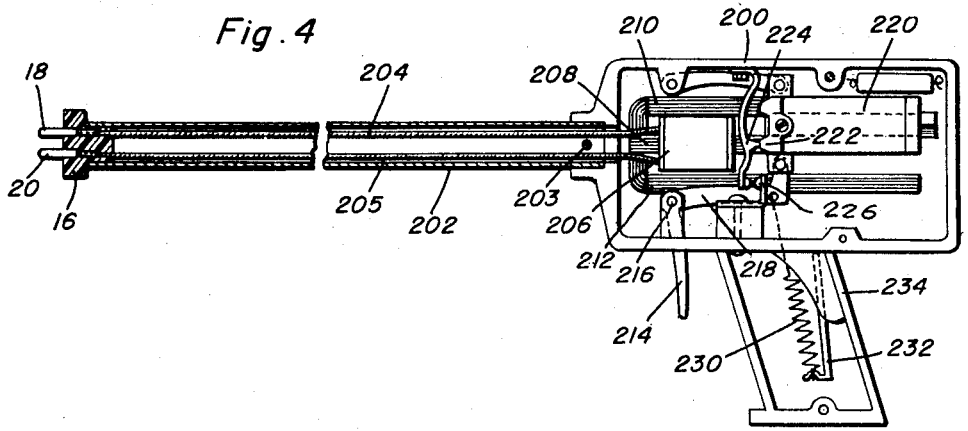
Fig. 4
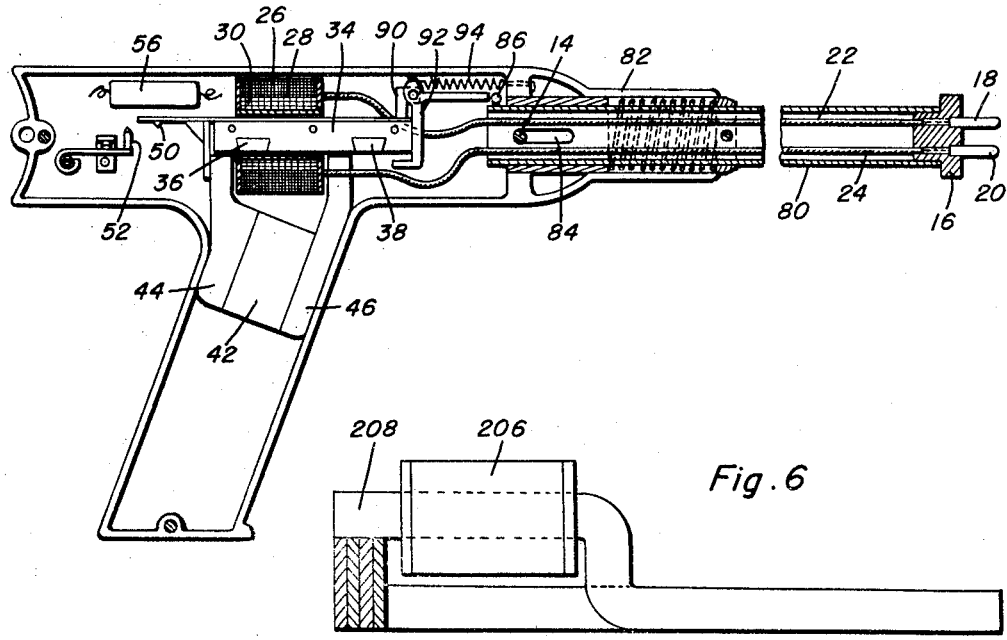
Fig. 5
Fig. 6
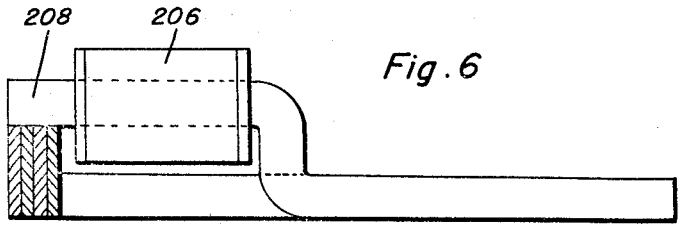
Fig. 7
Dale T. Gilmore
INVENTOR.
BY Clarence A. O'Brien
and Harvey B. Jackson
Attorneys June 30, 1959     D. T. GILMORE     2,892,585
PISTOL GRIP ELECTRIC PROD Filed April 23, 1957     3 Sheets-Sheet 3

Dale T. Gilmore
INVENTOR.

United States Patent Office 2,892,585
Patented June 30, 1959

2,892,585
PISTOL GRIP ELECTRIC PROD
Dale T. Gilmore, Springdale, Ark.
Application April 23, 1957, Serial No. 654,575
8 Claims. (Cl. 231—2)

This invention relates to an animal prod, and more particularly to a pistol grip electric prod.

The primary object of the present invention resides in the provision of a livestock prod capable of producing a high tension electrical current across prod contacts for electrically shocking an animal so as to cause the animal to move in the manner desired without necessitating the use of batteries or other external source of electrical power.

A further object of the present invention resides in the provision of a livestock prod that can be easily grasped by the hand of the user and which can be placed against any convenient part of the animal to cause the animal to move. The construction of this invention features various arrangements of magnets and coils together with suitable pole pieces whereby the magnetic field produced by the magnet will be disturbed to the extent that an electro-motive force will be induced in the coil.

A further object of the invention lies in the provision of a novel coil employing primary and secondary windings whereby a high voltage will be created across the prod contacts in a convenient manner with the livestock prod always ready for use and without requiring separate sources of power such as batteries or the like which may be dead or otherwise unusable.

These, together with the various ancillary objects and features of the invention which will become apparent as the following description proceeds, are attained by this pistol grip electric prod, preferred embodiments of which have been illustrated in the accompanying drawings, by way of example only, wherein:

Figure 4 is a longitudinal sectional view of a yet further form of the invention employing a trigger actuated movable magnet;

Figure 5 is a longitudinal sectional detail view of a modified form of the invention employing a movable barrel carrying the prod contacts, which movable barrel is connected to the stator for moving the stator;

Figure 6 is an enlarged detail view of the construction of the pole pieces and associated core utilizing the form of the invention shown in Figure 4;

Figure 7 is a sectional detail view illustrating the manner in which the movable magnet of the form of the invention shown in Figure 4 passes over the laminated pole pieces;

Figure 1:
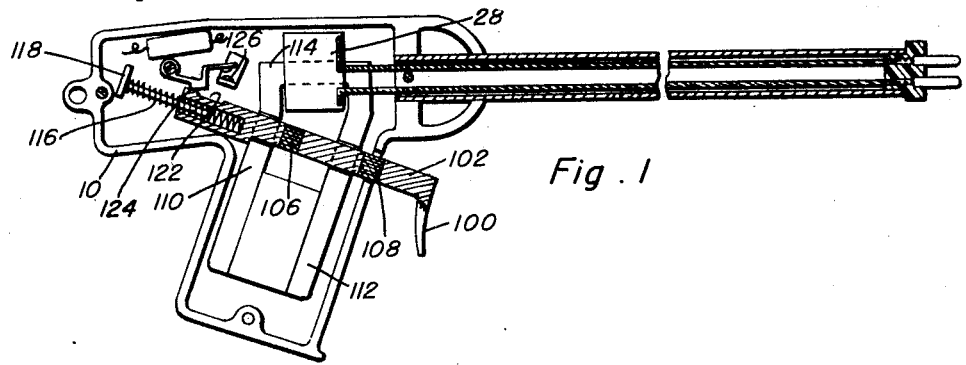
Figure 1 is a longitudinal sectional view of a first form of the invention employing a movable core piece actuated by linkage for disturbing the magnetic flux field.

With continuing reference to the drawings and initial reference to Figure 8, the basic electrical theory common to all the embodiments more fully described below will be explained. Numeral 11 represents a rectangular steel laminated core having an air gap 13. A permanent magnet 15 forms part of the core 11 for establishing a magnetic flux field through the core 11 across the air gap 13. A movable core 17 is adapted to reciprocably move within the air gap 13. The movable core includes sections of paramagnetic material such as steel 19 and sections of diamagnetic material such as brass 21. It will be apparent that the reluctance of the steel sections 19 differs from the reluctance of the brass sections 21. Accordingly, dependent upon which of the sections is centered in the air gap 13, the flux field established by the permanent magnet 15 through the core 11 will be either lesser or greater. More particularly, if the diamagnetic brass section 21 is centered in the air gap 13, a field of lesser intensity will be established in the core 11 than if the paramagnetic or steel sections 19 falls within the air gap 13. A primary winding 23 is wound on the core along with a secondary winding 25. It is contemplated that the winding 25 be a high voltage winding of a great number of turns while the primary winding 23 be a winding of lesser turns and accordingly lower voltage. Serially connected to the primary winding 23 is a switch 27 including a movable contact 29 and a fixed contact 31. Electrically connected in parallel with the contacts 29 and 31 is a capacitor 33. A projection 35 on the composite movable core 17 is adapted to open the connection between the contacts 29 and 31 as it proceeds along its path of travel. It should be apparent that when the movable core 17 is reciprocated within the air gap 13, the flux intensity within the core 11 will change, due to the change of reluctance of the magnetic flux path, and accordingly induce a voltage in the primary coil 23. The change in flux intensity is brought about by the change of material within the air gap 13 which is a result of movement of composite movable core 17. As the core 17 moves, the projection 35 moves proximate switch 27 and instantaneously moves movable contact 29 to open the connection between contacts 29 and 31. The current induced in the primary winding 23 by the change in magnetic flux intensity within the core 11 creates its own magnetic field within the core 11 which is immediately broken upon the opening of contacts 29 and 31. The magnetic field therefore will immediately collapse and a high voltage will be impressed across the terminals of the secondary winding 25. The capacitor 33 electrically connected in parallel with the contacts 29 and 31 serves to absorb surges of electrical energy to prevent arcing between the contacts 29 and 31 as their connection is broken by the projection 35. As will be understood later, the high voltage across the secondary 25 will be used to supply prod contacts for shocking an animal. It is thought that the electrical theory relative to the schematic diagram of Figure 8 can now be readily understood by one skilled in the art.

Figure 8:
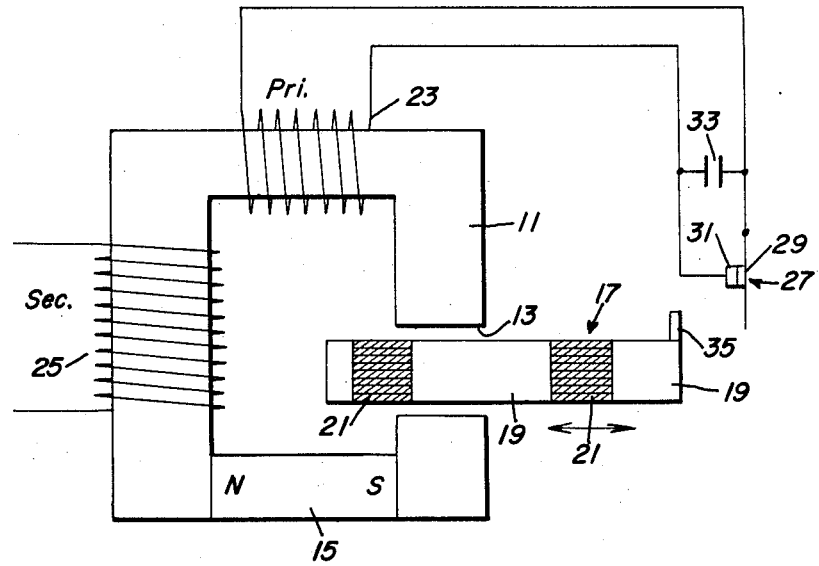
Figure 8 is a schematic wiring diagram illustrating the electric principles utilized in conjunction with this invention.
Figure 9:
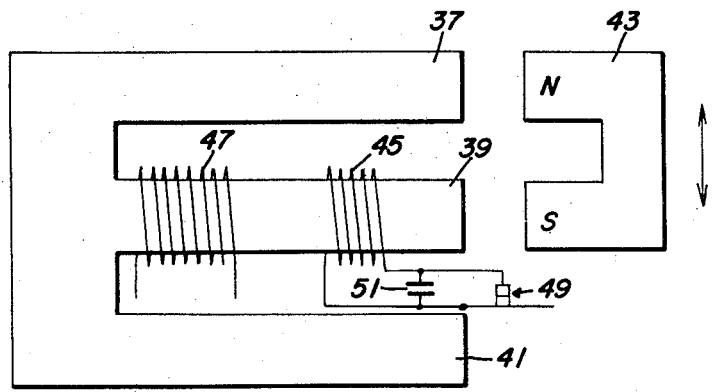
Figure 9 is a modified schematic wiring diagram.

The diagram of Figure 9 illustrates a system which is substantially similar to the system of Figure 8 but instead of utilizing a movable composite core, changes the orientation of a permanent magnet to change the relative flux field within a paramagnetic core having legs or pole pieces 37, 39 and 41. A permanent horseshoe magnet 43 is utilized in conjunction with the paramagnetic core. In Figure 9, we will see that with the permanent magnet 43 in the position illustrated, the flux field will proceed through the pole piece 37, through the pole piece 39 to the magnet. If the permanent magnet is moved downwardly, the flux field will proceed through the pole piece 39 and then through the pole piece 41 back to the magnet. Accordingly, it will be noted that the direction of flow through the pole piece 39 may be quickly changed by moving the magnet from adjacent the pole pieces 37 and 39 to adjacent the pole pieces 39 and 41. As above noted, as the flux field intensity changes within the core, a current will be induced in a primary winding 45. If the permanent magnet 43 is utilized to break the circuit of the primary winding 45 instantaneously, a high voltage may be induced in secondary winding 47 which may be applied to prod contacts of the pistol grip prod disclosed below. Accordingly, a switch 49 is utilized across the primary 45 with a capacitor 51 in parallel therewith. As the permanent magnet 43 moves downwardly, the flux field within the paramagnetic core is varied and the switch 49 is instantaneously opened to induce a high voltage in the secondary 47.

It is stressed that the manner illustrated in Figures 8 and 9 are for exemplary purposes only and do not exactly depict the structural relationships of the various embodiments which are more specifically described below.

Figure 3:
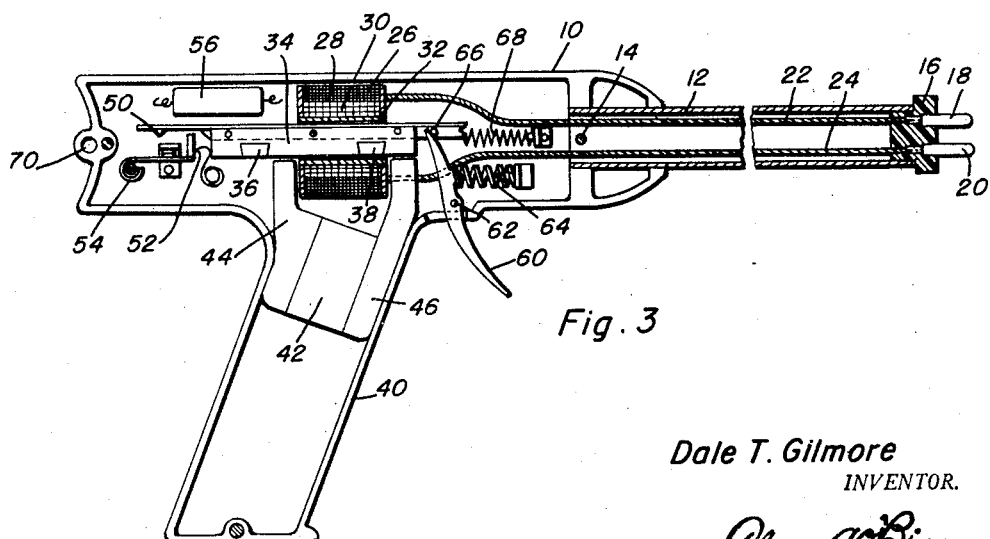
Figure 3 is a longitudinal sectional view of a further form of the invention employing a novel arrangement of movable core actuated by a trigger.

Now referring to Figure 3, reference numeral 10 generally designates a casing having a barrel 12 suitably affixed thereto as by a rivet 14 or the like. The barrel is provided with an insert 16 of insulative material such as tenite in which the two electric prod contacts 18 and 20 are mounted and connected by means of conductors 22 and 24 to the secondary winding 26 of a coil 28 which is also provided with a primary winding 30. There are distinct advantages present in the arrangement of the prod contacts 18 and 20 to avoid difficulties presented by short circuits and corrosion. The conductors 22 and 24 with their covering insulation are inserted into the tenite and soldered in place. This results in the protective insulation projecting into the tenite thus protecting against short circuits and corrosion. The coil 28 is disposed in the casing and is provided with a central opening 32 therethrough through which a movable core 34 extends. The core 34 is formed of any suitable magnetic material such as soft iron and the like and has brass inserts as at 36 and 38.

Mounted in the pistol grip section 40 of the casing 10 is an "alnico" magnetic preferably of the bar type which has associated therewith and abutting thereagainst the pole pieces 44 and 46. As can be readily observed, the pole pieces extend beyond the magnet 42 whereby the core 34 is adjacent to the pole pieces 44 and 46 but spaced from the magnet 42. Hence, the flux field passes through the pole pieces 44 and 46 and through the core 34. Thus, if the core 34 is moved, the flux field is changed to the extent that an electro-motive force will be induced in the coil 30. The primary winding 30 will have a suitable electro-motive force induced therein and the secondary winding 28 which includes many more turns than the primary winding will have the signal induced in the primary coil transformed into a high voltage. In order to raise the voltage in the primary coil to a sufficient potential, a condenser and breaker point arrangement is provided. This breaker point arrangement includes a breaker point of a switch mounted on the core 34 and indicated by reference numeral 50. This breaker point cooperates with a fixed breaker point 52 resiliently mounted in the casing as at 54 and connected to a condenser 56. The condenser in turn is serially connected to the primary winding across the breaker points.

In order to move the core 34 in the manner desired, there is provided a trigger 60 pivoted as at 62 to the casing and provided with a return spring 64. The trigger 60 is adapted to engage a detent 66 on the core 34 which is returned to its cocked position by means of return spring 68.

In use, it is necessary for the user in prodding an animal to merely pull on the trigger 60 to generate and induce sufficient current in the secondary coil to provide a high tension shock to the animal. In one pull of the trigger two shocks are produced across the brass inserts 36 and 38 due to the double change in magnetic flux as the trigger is pulled and then after release returned to its initial position.

A loop 70 may be provided as desired on the casing 10 to which a leather thong or the like may be affixed for convenient attachment to a belt or other portion of the user so that the device is always readily available.

It is particularly noted that the breaker points or contacts are open when the core is moved in either direction and the brass inserts 36 and 38 are centered over the pole pieces 44 and 46.

Referring now to the embodiment as is shown in Figure 5, it will be noted that in lieu of the trigger 60, there is provided a movable barrel 80 which is movably mounted in the casing which is provided with an extension 82. The barrel is provided with a slot 84 therein which cooperates with the pin 14 to limit the movement of the barrel and it is noted that the barrel is provided with a catch 86 mounted thereon.

Attached to a bracket 90 on the core 34 is a lever 92 of the shape shown which is engageable with the catch 86. A return spring 94 is provided for the lever.

In use, this form of the invention functions very similar to the form of the invention shown in Figure 3. The trigger is replaced by the sliding barrel extension which actuates the core 34. The operation of this model is accomplished by placing the prod contacts 18 and 20 against the animal and the pistol grip portion of the prod is moved forward thereby causing the core 34 to break the magnetic circuit as it is moved rectilinearly to its backward position due to the force of the catch 86 impressed on the lever 92. At this point the lever 92 disengages from the catch 86 and the core return spring 94 will pull the core to its forward position causing the magnetic circuit to break again.

Referring now to the form of the invention as is shown in Figure 1, it will be noted that the trigger 100 thereof is affixed to the core 102 which has suitable inserts of brass 106 and 108. These inserts when in alinement with the pole pieces 110 and 112 break the magnetic flux circuit through the core 102. The pole pieces 110 and 112 are provided with an extension 114 about which the coil 28 is positioned. The core 102 is provided with a return spring 116 mounted on a plunger 118 fitted in the casing 10, and it is noted that the core is provided with a plurality of cam surfaces 122 which cooperate with a cam surface 124 on a pivotally mounted contact member 126 to cooperate with the contact 128 to form a switch functioning much in the same manner as the breaker contacts of the switch shown in the other forms of the invention. The manner of operation of this invention is substantially similar to that of the other forms of the invention.

Figure 2:
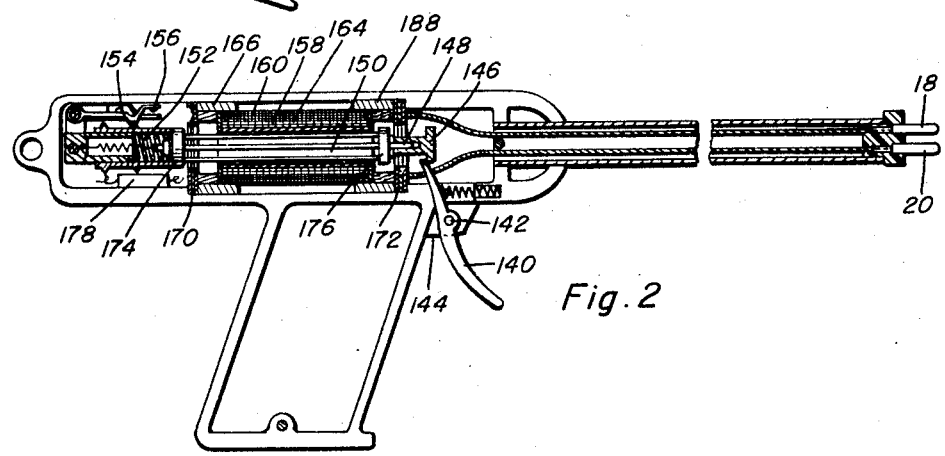
Figure 2 is a longitudinal sectional view of a modified form of the invention employing cylindrical magnets.

Referring now to the embodiment of the invention as is shown in Figure 2, it will be noted that herein there is provided a trigger 140 pivotally mounted as at 142 to an extension 144 of the casing. The trigger 140 engages a brass trigger catch 146 secured by a fastener 148 to a soft iron rod core 150. The core 150 is provided with a spring 152 for returning it to its cocked position and carries breaker actuating cams 154 for actuating a switch 156 controlling the circuit of the primary coil 158 of this form of the invention. The secondary coil 160 is connected to the contact prods 18 and 20. It is especially noted that the core 150 slides within a central opening in the coil 164 and that the coil is of a special shape and cooperates with the cylindrical "alnico" magnets 166 and 168. Disk shaped pole pieces 170 and 172 are provided and may be of opposite polarity due to the opposite polarity of the magnets. Mounted on the core 150 are pole pieces 174 and 176 and when these pole pieces are in alinement with the pole pieces 170 and 172, the magnetic flux field will be completed. When the core 150 is moved, the pole pieces will become misaligned to vary the flux intensity about the coil 164. Simultaneously, as the core 150 moves, the breaker points and hence the switch 156 is actuated to impress a high voltage across prod contacts 18 and 20.

Referring to the embodiment of the invention shown in Figures 4, 6 and 7, it will be noted that herein the casing 200 has the barrel 202 affixed thereto by means of a rivet 203 much in the same manner as the other forms of the invention. The prod contacts 18 and 20 are identical with the other forms of prod contacts and are seated in the insulative bushing 16. Conductors 204 and 205 connect the prods to the special form of coil 206 mounted about one section 208 of the pole pieces, there being three pole pieces 208, 210 and 212 in total. A trigger 214 is pivoted as at 216 and a linkage 218 connects the trigger 214 to a movable magnet 220. The pole pieces are spaced from each other so when the magnet 220 which is generally of a channel shape is moved vertically across the pole pieces it will induce an electro-motive force in the coil 206 so that the device can function much in the same manner as the other forms of the invention. The magnet carries breaker cams 222 which engage a movable switch member 224 cooperating with a fixed switch member 226 to control the circuit to the condenser and coil. A return spring 230 is provided for the magnet and is connected to the linkage 218 and to a bracket 232 mounted within the pistol grip 234 of the casing 200.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pistol grip electric prod comprising a casing having a pistol grip, a pair of prod contacts supported in said casing and extending outwardly therefrom, a magnetic flux field assembly including a permanent magnet in said casing, manual means for instantaneously changing the magnetic flux field intensity, a high voltage winding, said prod contacts connected across said high voltage winding, said winding supported within the magnetic field of said assembly, said means for changing the flux intensity of said magnetic field including a composite movable core having portions of differing reluctance.

2. A pistol grip electric prod comprising a casing having a pistol grip, a pair of prod contacts supported in said casing and extending outwardly therefrom, a magnetic flux field assembly including a permanent magnet in said casing, manual means for instantaneously changing the magnetic flux field intensity, a high voltage winding, said prod contacts connected across said high voltage winding, said winding supported within the magnetic field of said assembly, said means for changing the flux intensity of said magnetic field including a movable member, said member forming a portion of the magnetic flux field path whereby a movement of said member will change the reluctance of said path.

3. A pistol grip electric prod comprising a casing having a pistol grip, a pair of prod contacts supported in said casing and extending outwardly therefrom, a magnetic flux field assembly including a permanent magnet in said casing, manual means for instantaneously changing the magnetic flux field intensity, a low voltage primary winding, a high voltage secondary winding, said prod contacts connected across said secondary winding, said windings inductively coupled and supported within the magnetic field of said assembly, said means for changing the flux intensity of said magnetic field including a composite movable core having portions of differing reluctance, a switch electrically serially connected to said primary winding, said switch including a pair of normally closed contacts, a first of said contacts fixed in said casing, a second of said contacts being resiliently mounted in said casing and normally urged into connection with said fixed contact, means carried by said movable core for instantaneously breaking said connection.

4. A pistol grip electric prod comprising a casing having a pistol grip, a pair of prod contacts supported in said casing and extending outwardly therefrom, a magnetic flux field assembly including a permanent magnet in said casing, manual means for instantaneously changing the magnetic flux field intensity, a low voltage primary winding, a high voltage secondary winding, said prod contacts connected across said secondary winding, said windings inductively coupled and supported within the magnetic field of said assembly, said means for changing the flux intensity of said magnetic field including a composite movable core having portions of differing reluctance, a switch electrically serially connected to said primary winding, said switch including a pair of normally closed contacts, a first of said contacts fixed in said casing, a second of said contacts being resiliently mounted in said casing and normally urged into connection with said fixed contact, means carried by said movable core for instantaneously breaking said connection, a trigger assembly, said trigger assembly engaging said movable core to move said movable core upon actuation of said trigger assembly.

5. A pistol grip electric prod comprising a casing having a pistol grip, a pair of prod contacts supported in said casing and extending outwardly therefrom, a magnetic flux field assembly including a permanent magnet in said casing, manual means for instantaneously changing the magnetic flux field intensity, a low voltage primary winding, a high voltage secondary winding, said prod contacts connected across said secondary winding, said windings inductively coupled and supported within the magnetic field of said assembly, said means for changing the flux intensity of said magnetic field including a composite movable core having portions of differing reluctance, a switch electrically serially connected to said primary winding, said switch including a pair of normally closed contacts, a first of said contacts fixed in said casing, a second of said contacts being resiliently mounted in said casing and normally urged into connection with said fixed contact, means carried by said movable core for instantaneously breaking said connection, a trigger assembly, said trigger assembly engaging said movable core to move said movable core upon actuation of said trigger assembly, said movable core resiliently retained in said casing, said trigger assembly adapted to move said movable core against said resilient retention.

6. A pistol grip electric prod comprising a casing having a pistol grip, a pair of prod contacts supported in said casing and extending outwardly therefrom, a magnetic flux field assembly including a permanent magnet in said casing, manual means for instantaneously changing the magnetic flux field intensity, a low voltage primary winding, a high voltage secondary winding, said prod contacts connected across said secondary winding, said windings inductively coupled and supported within the magnetic field of said assembly, said means for changing the flux intensity of said magnetic field including a composite movable core having portions of differing reluctance, a switch electrically serially connected to said primary winding, said switch including a pair of normally closed contacts, a first of said contacts fixed in said casing, a second of said contacts being resiliently mounted in said casing and normally urged into connection with said fixed contact, means carried by said movable core for instantaneously breaking said connection, a barrel movably carried by said casing, said prod contacts extending through said barrel, a catch carried by said barrel, said catch positioned to engage said movable core upon movement of said barrel.

7. A pistol grip electric prod comprising a casing having a pistol grip, a pair of prod contacts supported in said casing and extending outwardly therefrom, a magnetic flux field assembly including a permanent magnet in said casing, manual means for instantaneously changing the magnetic flux field intensity, a low voltage primary winding, a high voltage secondary winding, said prod contacts connected across said secondary winding, said windings inductively coupled and supported within the magnetic field of said assembly, said means for changing the flux intensity of said magnetic field including a composite movable core having portions of differing reluctance, a switch electrically serially connected to said primary winding, said switch including a pair of normally closed contacts, a first of said contacts fixed in said casing, a second of said contacts being resiliently mounted in said casing and normally urged into connection with said fixed contact, means carried by said movable core for instantaneously breaking said connection, a barrel movably carried by said casing, said prod contacts extending through said barrel, a catch carried by said barrel, said catch positioned to engage said movable core upon movement of said barrel, said movable core resiliently retained in said casing, said trigger assembly adapted to move said movable core against said resilient retention.

8. A pistol grip electric prod comprising a casing having a pistol grip, a pair of prod contacts supported in said casing and extending outwardly therefrom, a magnetic flux field assembly including a permanent magnet and a magnetic core, means mounting said permanent magnet adjacent said core for movement with respect to said core for inducing different directional magnetic flux fields in said core, a high voltage winding positioned proximate said core, said prod contacts connected across said high voltage windings and a trigger assembly, said trigger assembly engaging said movable magnet to move said magnet upon actuation of said trigger assembly to induce a voltage in said high voltage winding.

References Cited in the file of this patent

UNITED STATES PATENTS

| | | |
|---|---|---|
| 427,549 | Burton | May 13, 1890 |
| 2,208,852 | Mongan | July 23, 1940 |
| 2,466,308 | Fischer | Apr. 5, 1949 |
| 2,570,693 | Koonz | Oct. 9, 1951 |
| 2,733,003 | Abildgaard et al. | Jan. 31, 1956 |